Aug. 11, 1959     D. G. KEITH     2,898,714
METHOD OF AND APPARATUS FOR PACKAGING FLOWABLE
MATERIALS IN THERMOPLASTIC SHEET MATERIAL
Filed May 19, 1958

INVENTOR
DONALD G. KEITH

United States Patent Office 2,898,714
Patented Aug. 11, 1959

---

2,898,714
METHOD OF AND APPARATUS FOR PACKAGING FLOWABLE MATERIALS IN THERMOPLASTIC SHEET MATERIAL

Donald George Keith, Balwyn, Victoria, Australia

Application May 19, 1958, Serial No. 736,030
Claims priority, application Australia May 20, 1957

3 Claims. (Cl. 53—30)

This invention relates to a method for packaging a quantity of flowable solid material in a sheet of crystalline synthetic resinous material having a truly liquid melt, for example, polythene, nylon or polyethylene terephthalate.

The methods used for packaging solids in rubber hydrochloride film are not generally suitable for use in connection with these resinous materials, as these methods depend on the limited extensibility of rubber hydrochloride film, whereas molten polyethene and like substances can be extended indefinitely and offer no resistance to breaking of the film.

Known methods of using polythene involve the production of bags from polythene film, which are then sealed and filled. That is, three separate operations are involved, namely, making, filling and sealing the bag. Machines are known in which raw polythene and solid material to be packed are fed into the machine, which delivers the material ready bagged at its outlet, however these machines are necessarily complex in construction, as they include an extruder for polythene tube, sealing mechanism and filling mechanism.

It is the principal object of the present invention to provide a method for packaging flowable solid materials, for example powders, granulated solids, and discrete objects such as nuts and bolts, at a single operation in a sheet of crystalline synthetic resinous material having a truly liquid melt, without using complex apparatus.

The present invention accordingly provides a method of packaging a quantity of flowable solid material comprising the steps of supporting in a substantially horizontal position a flat sheet of crystalline synthetic resinous material having a truly liquid melt; heating said sheet to bring it to the consistency of a viscous liquid; and then pouring said flowable solid material onto the synthetic resinous material and simultaneously allowing the said resinous material to stretch downwardly at a controlled rate under the weight of the solid material while laterally confined.

The package is preferably sealed by twisting the marginal portions of the sheet together by spinning the package. A tube or pouring spout may, if desired, be incorporated in the gathered marginal portions.

The sheet may of course be pressed together in other ways, for example, by horizontally reciprocating members, or the distension may be continued until the sheet comes together above the flowable material, and parts.

Any thermoplastic material of sharp melting point may be used, polythene being particularly suitable.

Reference will now be made to the accompanying drawing which is to be taken by way of example only and in which.

Figure 1:
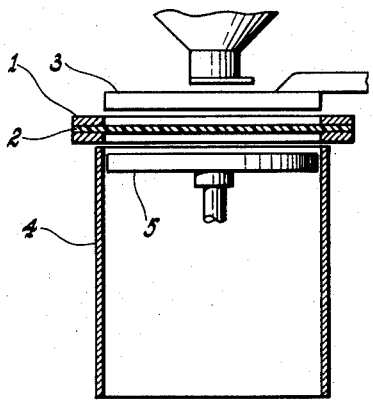
Figures 1 to 4 illustrate an apparatus according to the invention showing a method of packaging a quantity of flowable material.
Figure 2:
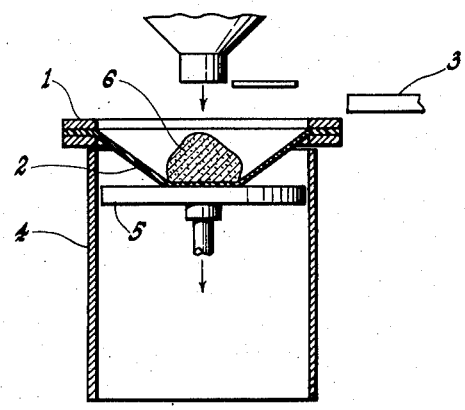

Referring to the embodiment illustrated in Figures 1 to 4, there is provided a horizontal cylindrical clamping ring 1 to hold a polythene sheet 2, a removable electric heating element 3 to heat the sheet, and a vertical cylindrical open tube 4 coaxial with, of the same diameter as, and below the clamping ring. A loose-fitting piston 5 is mounted for manual reciprocation in the tube in such a way that a rotating, or spinning, motion may be imparted to it manually when desired.

Figure 3:
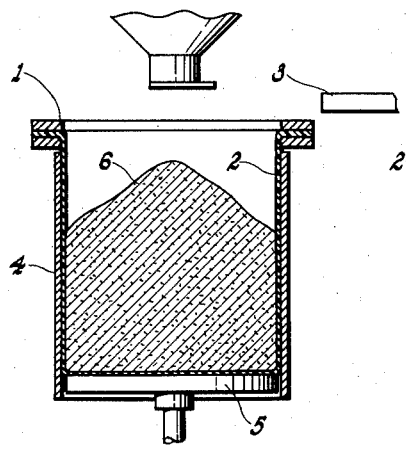

In use, a sheet of polythene is clamped in the clamping ring, the piston is brought under the clamping ring, the heating element is brought into position and the sheet is heated until viscous, the material 6 to be packed is poured on to the centre of the heated portion of the sheet within the clamping ring, and the piston is slowly lowered. As the material is poured, the sheet stretches downwardly (Fig. 2) under the weight of the material until it engages the top of the piston, whereupon the body of material spreads out horizontally until it occupies the whole cross-section of the tube (Fig. 3). As more material is poured, the piston is lowered until at the completion of pouring, the material is enclosed in polythene film of approximately rectangular elevation the top surface of the material being horizontal if a liquid or paste, and if a powder, a cone having a slope to the horizontal equal to the angle of repose of the material.

Figure 4:
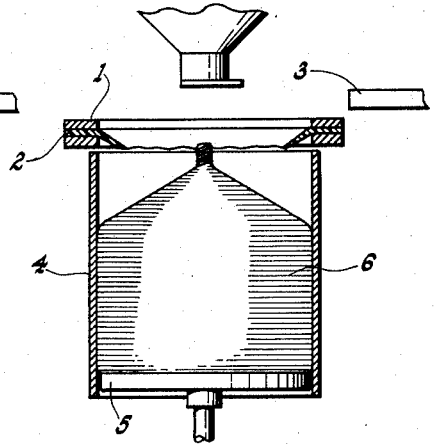
Figure 5:
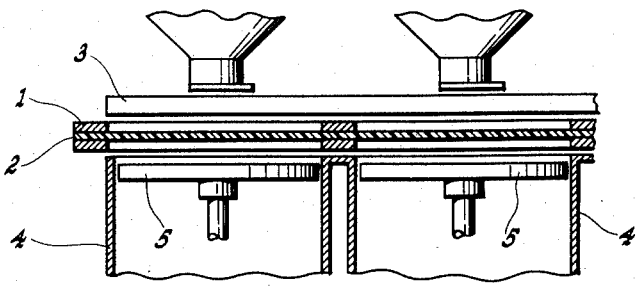
Figure 5 shows a duplex combination of the apparatus shown in Figures 1 to 4.

The piston is then rotated to cause the sheet above the material to bunch together and then break, leaving the material totally enclosed in polythene (Fig. 4).

It will be appreciated that the clamping ring may be other than circular in form, and may have a different cross-section to the tube, which can be replaced by an open-ended vertical prism of any desired cross-section, for example square or hexagonal. As the cross-section of the prism determines that of the completed package, it is possible, by suitably selecting the size and shape of the prism, to produce a package which fits neatly into a preformed box or other outer container.

Figure 6:
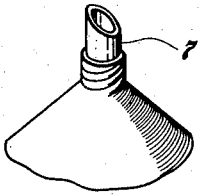
Figure 6 illustrates a tube or pouring spout incorporated in the covered marginal portion of the thermoplastic sheet.

As suggested above, a polyethene tube may be bonded into the closure as it is formed to provide a neck or pouring spout 7 (Fig. 6), or a rod to which the hot polythene will not adhere may be included in the closure, leaving after removal an orifice in the package.

It is obvious that methods of closing the package other than the above described twisting motion may be employed.

Having now described my invention, what I claim as new and desire to secure by Letters Patent is:

1. A method of packaging a quantity of flowable solid material comprising the steps of: supporting in a substantially horizontal position a flat sheet of crystalline synthetic resinous material having a truly liquid melt; heating said sheet to bring it to the consistency of a viscous liquid; and then pouring said flowable solid material onto the synthetic resinous material and simultaneously allowing the said resinous material to stretch downwardly at a controlled rate under the weight of the solid material while laterally confined.

2. A method as claimed in claim 1 wherein the marginal portions of the synthetic resinous sheet are gathered by spinning the distended sheet and partially enclosed flowable solid material to twist the marginal portions of the sheet together.

3. A method as claimed in claim 2, characterized by inserting a tube or pouring spout into the gathered marginal portions of the sheet.

References Cited in the file of this patent

UNITED STATES PATENTS

| | | |
|---|---|---|
| 2,166,568 | Kuhlke | July 18, 1939 |
| 2,289,668 | Mallory | July 14, 1942 |
| 2,335,978 | Vogt | Dec. 7, 1943 |
| 2,618,814 | Paton et al. | Nov. 25, 1952 |
| 2,622,380 | Snyder | Dec. 23, 1952 |
| 2,720,309 | Kimball | Oct. 11, 1955 |